(12) United States Patent
Furuta (10) Patent No.: US 10,057,472 B2
(45) Date of Patent: Aug. 21, 2018

(54) FLASH UNIT HAVING MOVABLE LIGHT EMITTING UNIT AND IMAGE PICKUP APPARATUS EQUIPPED WITH FLASH UNIT

(71) Applicant: CANON KABUSHIKI KAISHA, Tokyo (JP)

(72) Inventor: Takashi Furuta, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/656,631

(22) Filed: Jul. 21, 2017

(65) Prior Publication Data
US 2018/0035026 A1 Feb. 1, 2018

(30) Foreign Application Priority Data
Jul. 29, 2016 (JP) .................. 2016-149846

(51) Int. Cl.
 H04N 5/225 (2006.01)
 H04N 5/232 (2006.01)
 F21K 5/06 (2006.01)
 G03B 15/04 (2006.01)

(52) U.S. Cl.
 CPC ....... *H04N 5/2256* (2013.01); *G03B 15/0405* (2013.01); *G03B 15/0442* (2013.01); *H04N 5/23293* (2013.01)

(58) Field of Classification Search
 CPC ........... H04N 5/23293; H04N 1/00183; H04N 1/00472; H04N 7/142; B60R 2300/802; G03B 17/20; H04M 1/0233
 See application file for complete search history.

(56) References Cited

U.S. PATENT DOCUMENTS

| 5,066,967 | A  | * | 11/1991 | Yamamoto | G03B 15/05 396/177 |
| 6,295,088 | B1 | * | 9/2001  | Tsukahara | H04N 5/2252 348/333.06 |
| 6,819,868 | B2 | * | 11/2004 | Kume | G03B 7/02 348/333.06 |
| 6,909,847 | B2 |   | 6/2005  | Ujikane et al. | |
| 7,126,816 | B2 | * | 10/2006 | Krah | G06F 1/1616 361/679.55 |

(Continued)

FOREIGN PATENT DOCUMENTS

JP 5078967 B2 11/2012

*Primary Examiner* — Trung Diep
(74) *Attorney, Agent, or Firm* — Rossi, Kimms & McDowell LLP (57) ABSTRACT

An image pickup apparatus equipped with a flash unit that is capable of popping up a light emitting unit even if a display panel is directed to a photographing direction. The flash unit is provided on an upper face of a body of the image pickup apparatus and includes three parallel rotating shafts, a first support member that is rotatably connected with the light emitting unit through the first rotating shaft, and a second support member that is rotatably connected with the first support member through the second rotating shaft and is rotatably connected with the body through the third rotating shaft. The light emitting unit is movable between a light-emitting position projected and a retracted position inside the body even if the display unit is in a stand-up position that is rotated from a regular position opposite to a back face of the body by 180 degrees.

9 Claims, 5 Drawing Sheets

(56) References Cited

U.S. PATENT DOCUMENTS

| | | | | |
|---|---|---|---|---|
| 7,496,389 B2* | 2/2009 | Cho | ............... | H04M 1/0237 |
| | | | | 455/575.1 |
| 7,580,627 B2* | 8/2009 | Kamei | ............ | H04N 5/2251 |
| | | | | 396/312 |
| 8,060,160 B2* | 11/2011 | Shin | ............... | H04M 1/0233 |
| | | | | 379/433.02 |
| 2002/0102946 A1* | 8/2002 | SanGiovanni | ...... | H04M 1/0212 |
| | | | | 455/575.1 |
| 2002/0158812 A1* | 10/2002 | Pallakoff | ......... | H04M 1/0214 |
| | | | | 345/5 |
| 2004/0257752 A1* | 12/2004 | Lee | ................ | G06F 1/162 |
| | | | | 361/679.04 |
| 2006/0240873 A1* | 10/2006 | You | ............... | H04M 1/0241 |
| | | | | 455/566 |

* cited by examiner

FLASH UNIT HAVING MOVABLE LIGHT EMITTING UNIT AND IMAGE PICKUP APPARATUS EQUIPPED WITH FLASH UNIT

BACKGROUND OF THE INVENTION

Field of the Invention

The present invention relates to a flash unit having a light emitting unit that is movable between a retracted position and light-emitting position, and an image pickup apparatus equipped with the flash unit.

Description of the Related Art

There is a known image pickup apparatus that contains a flash unit. A flash unit called a pop-up system is known (for example, see Japanese Patent Publication No. 5078967). In such a flash unit, a light emitting unit is held at a light-emitting position that is projected upward from a body of an image pickup apparatus at the time of use (at the time of emission), and the light emitting unit can be retracted inside the image pickup apparatus at the time of no use. The flash unit of the pop-up system is able to move the light emitting unit to the position away from a photographing optical axis and to make it emit light. Accordingly, even if a photographing lens is projected largely from a front face of a body of an image pickup apparatus, unexpected appearance of a shadow of the photographing lens caused by emission in a photographing area is reduced or removed.

On the other hand, miniaturization and slimming down of a body of an image pickup apparatus are required. Moreover, a function that makes a display unit, which is provided in a back face of a body of an image pickup apparatus, become rotatable by 180 degrees is needed so that a photographer oneself is able to see an object displayed on a display panel (a liquid crystal panel, for example) of the display unit when the photographer photographs oneself as an object (selfie).

In a conventional pop-up flash unit, when a user is going to pop up a light emitting unit in a state where a display unit is rotated by 180 degrees so that a display panel is directed to a photographing direction (an object side), the light emitting unit may not pop up because an upper surface of the light emitting unit collides with the display unit. In this case, since the user is needed to once return the display unit to the back face and to rotate the display unit again so that the display panel is directed to the photographing direction after popping up the light emitting unit, operability is not good. Moreover, a size of a body of an image pickup apparatus is limited in order to satisfy a requirement of miniaturization or slimming down, while a pop-up amount is needed to be large in order to reduce unexpected appearance of a shadow of the photographing lens caused by emission in a photographing area.

SUMMARY OF THE INVENTION

The present invention provides an image pickup apparatus equipped with a flash unit that is capable of popping up a light emitting unit even in a state where a display panel of a display unit, which is provided in a back face of a body of the image pickup apparatus, is directed to a photographing direction. Moreover, the present invention provides an image pickup apparatus equipped with a flash unit of which a pop-up amount is large.

Accordingly, a first aspect of the present invention provides an image pickup apparatus including a display unit that is arranged rotatably between a regular position opposite to a back face of a body of the image pickup apparatus and a stand-up position that is rotated from the regular position by about 180 degrees so as to stand up from an upper face of the body, and a flash unit that is provided on the upper face of the body so that a light emitting unit is movable between a light-emitting position that is projected from the body and a retracted position that is retracted inside the body. The flash unit includes a first rotating shaft, a second rotating shaft, and a third rotating shaft that are arranged in parallel mutually, a first support member that is rotatably connected with the light emitting unit through the first rotating shaft, and a second support member that is rotatably connected with the first support member through the second rotating shaft and is rotatably connected with the body through the third rotating shaft. The third rotating shaft is arranged more on a side of the back face of the body than the first rotating shaft and the second rotating shaft is arranged more on a side of a front face of the body than the first rotating shaft in a case where the light emitting unit is in the retracted position. The light emitting unit is movable between the retracted position and the light-emitting position even in a case where the display unit is in the stand-up position.

Accordingly, a second aspect of the present invention provides a flash unit provided in an image pickup apparatus, the flash unit including a first rotating shaft, a second rotating shaft, and a third rotating shaft that are arranged in parallel mutually, a light emitting unit and a first support member that are mutually and rotatably connected through the first rotating shaft, a second support member that is rotatably connected with the first support member through the second rotating shaft and is rotatably connected with the image pickup apparatus through the third rotating shaft, a first energizing member that gives energization force that spreads an angle between the light emitting unit and the first support member to the light emitting unit and the first support member, a second energizing member that gives energization force that spreads an angle between the first support member and the second support member to the first support member and the second support member, and a third energizing member that gives energization force that rotates the second support member around the third rotating shaft to the second support member. The third rotating shaft is arranged more on a side of a back face of the image pickup apparatus than the first rotating shaft and the second rotating shaft is arranged more on a side of a front face of the image pickup apparatus than the first rotating shaft in a case where the light emitting unit is in a retracted position that is retracted inside the image pickup apparatus. The light emitting unit is moved from the retracted position to a light-emitting position that is projected from the image pickup apparatus when the light emitting unit rotates around the first rotating shaft by a predetermined angle according to the energization force of the first energizing member, the first support member rotates around the second rotating shaft by a predetermined angle according to the energization force of the second energizing member, and the second support member rotates around the third rotating shaft by a predetermined angle according to the energization force of the third energizing member.

According to the present invention, the image pickup apparatus equipped with the flash unit that is capable of popping up a light emitting unit in a state where the display panel of the display unit is directed to the photographing direction. Moreover, the pop-up amount of the light emitting unit becomes large.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
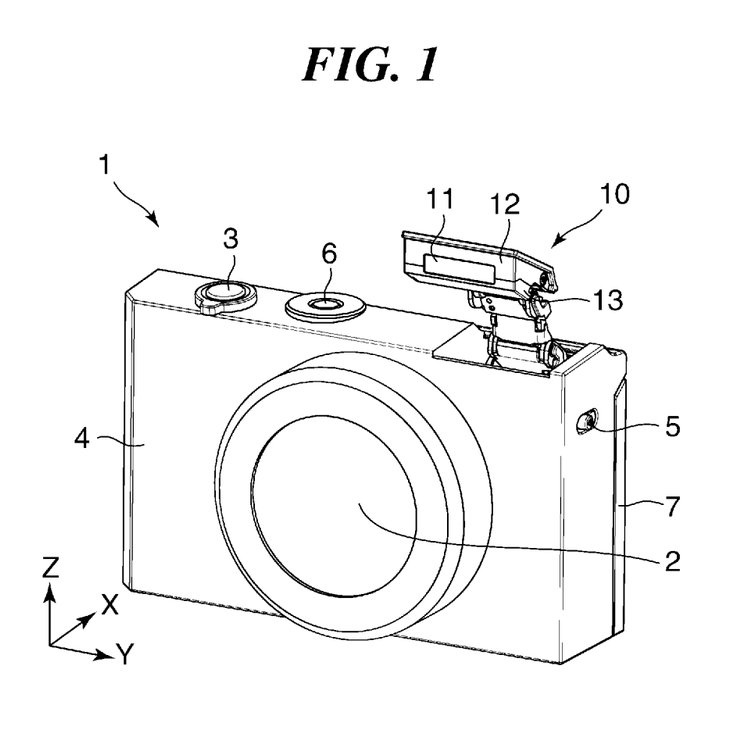
FIG. 1 is a front perspective view showing a state where a light emitting unit of an image pickup apparatus according to an embodiment of the present invention is popped up to a light-emitting position.

FIG. 1 is a front perspective view schematically showing a configuration of an image pickup apparatus 1 according to an embodiment of the present invention. An X-axis, a Y-axis, and a Z-axis that intersect perpendicularly to one another are defined for convenience of description as shown in FIG. 1. An X-axis direction is a front-and-back direction of the image pickup apparatus 1, and a Y-axis direction is a width direction of the image pickup apparatus 1. A Z-axis direction is a height direction of the image pickup apparatus 1.

The image pickup apparatus 1 has a body 4 covered with an exterior cover. A lens group 2 that constitutes an image pickup optical system is arranged at a front face of the body 4. An optical axis direction of the image pickup optical system is parallel to the X-axis direction. An image pickup device (not shown), such as a CMOS sensor or a CCD sensor, is arranged inside the body 4. Light flux passing through the image pickup optical system forms an optical image on the image pickup device. The image pickup device converts the optical image into an electrical signal by photoelectric conversion. An image processing circuit (not shown) provided in the body 4 converts the electrical signal output from the image pickup device into image data, and stores the image data generated into the storage unit (not shown). Moreover, a control board etc. for controlling operations of the image pickup apparatus 1 is arranged inside the body 4. A shutter button 3 and a power button 6 are arranged on an upper face of the body 4.

Moreover, a flash unit having a light emitting unit 10 is provided on the upper face of the body 4. FIG. 1 shows a state where the light emitting unit 10 pops up to a light-emitting position. The light emitting unit 10 has a light emitting component 11, an upper face cover that covers the upper face of the light emitting component 11, and a bottom face cover 13 that covers the bottom face of the light emitting component 11. A control lever 5 for popping up the light emitting unit 10 is provided in a side face of the body 4. An operation of the control lever 5 pops up the light emitting unit 10 from the upper face of the body 4 to move to the light-emitting position. It should be noted that the upper surface cover 12 of the light emitting unit 10 constitutes the upper face of the body 4 when the light emitting unit 10 is in a retracted position that is retracted inside the body 4 (see FIG. 2A). Details of the configuration of the light emitting unit 10 will be mentioned later.

A display unit 7 is attached to the back face of the body 4 rotatably. As shown in FIG. 1, when the display unit 7 is in a position opposite to the back face of the body 4 (hereinafter referred to as a "regular position"), the display panel 7a (see FIG. 2A) of the display unit 7 is directed to a backward direction (opposite to a photographing direction) of the image pickup apparatus 1.

Figure 2A:
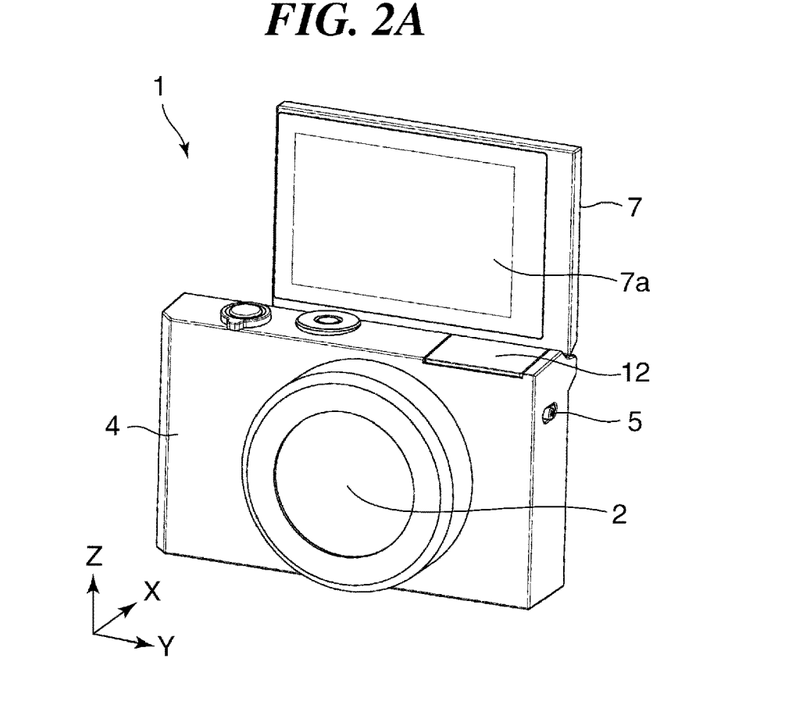
FIG. 2A and FIG. 2B are a front perspective view and a back perspective view, respectively, showing a state where a display panel of a display unit of the image pickup apparatus shown in FIG. 1 is directed to an object side.
Figure 2B:
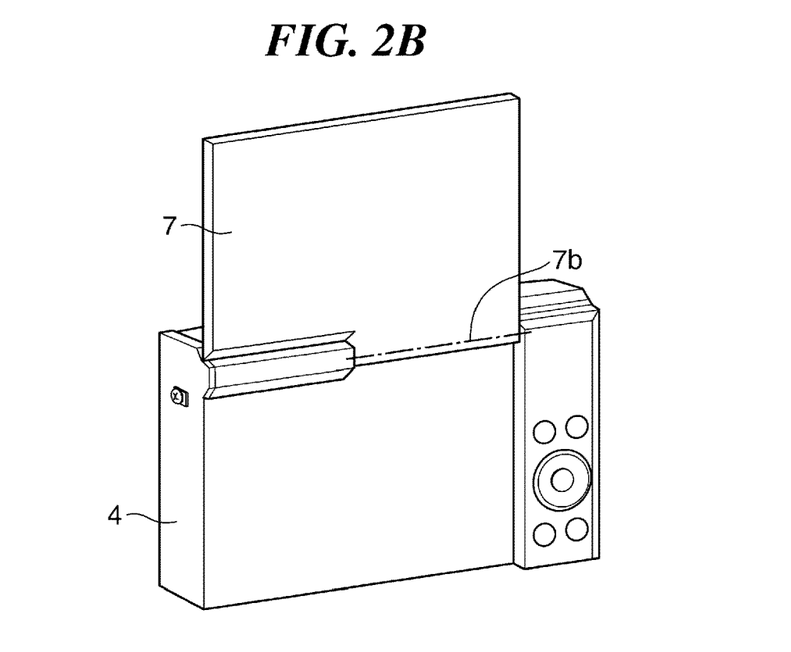

FIG. 2A is a front perspective view of the image pickup apparatus 1 in a case where the display panel 7a of the display unit 7 is directed to the photographing direction and the light emitting unit 10 is in the retracted position. FIG. 2B is a back perspective view corresponding to the state of FIG. 2A. The display unit 7 is configured to protect the display panel 7a with a housing cover. The display panel 7a is a liquid crystal panel, for example. Image information, such as an object under photography, is displayed on the display panel 7a. A rotating shaft 7b of the display unit 7 is approximately parallel to the Y-axis, and the display unit 7 is rotatable around the rotating shaft 7b by about 180 degrees. Hereinafter, the position of the display unit 7 where the display unit 7 stands up from the upper face of the body 4 and the display panel 7a is directed to the photographing direction is referred to as a "stand-up position". That is, the display unit 7 is movable between the regular position and the stand-up position.

Figure 3:
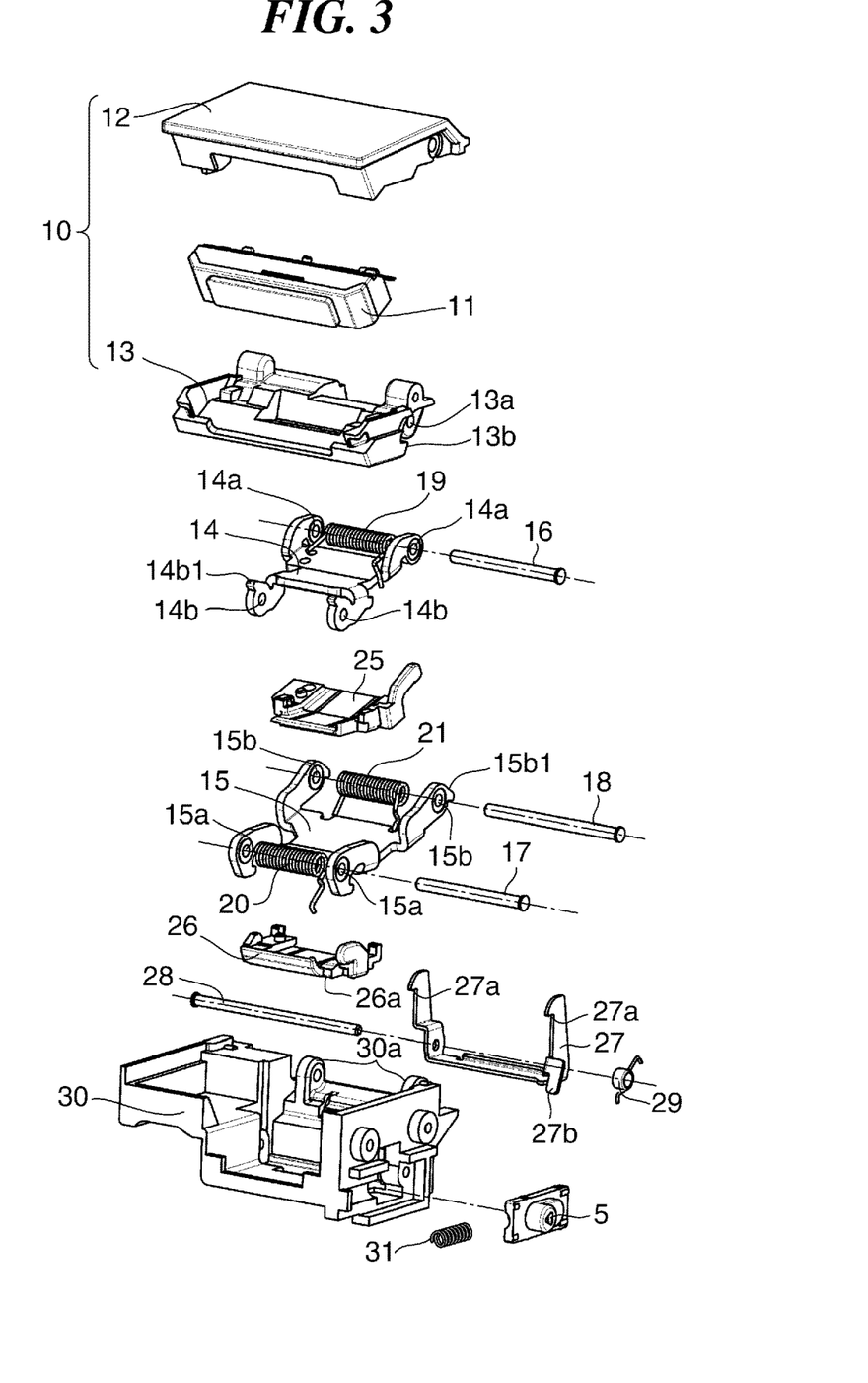
FIG. 3 is an exploded perspective view showing a flash unit of the image pickup apparatus shown in FIG. 1.
Figure 4:
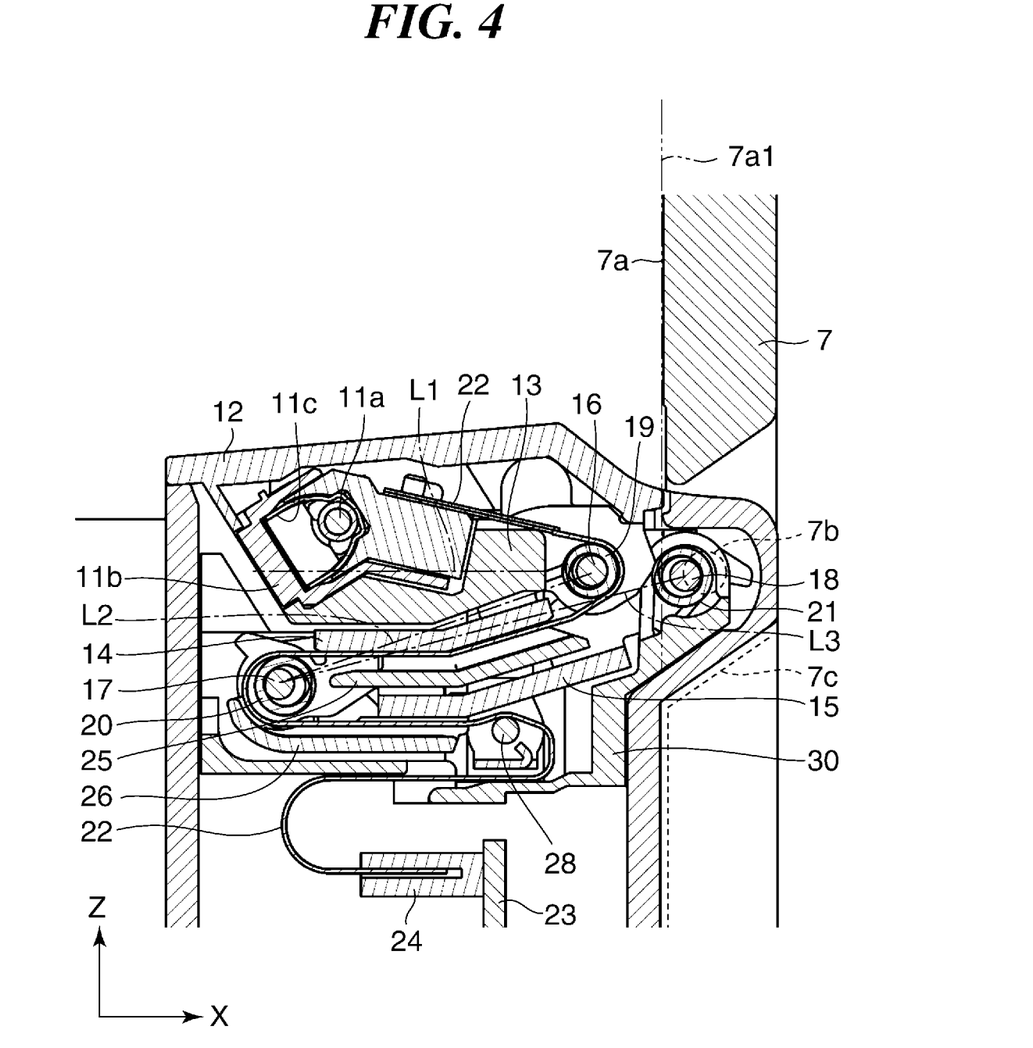
FIG. 4 is a sectional view showing the flash unit shown in FIG. 3 in a case where a light emitting unit is in a retracted position.
Figure 5:
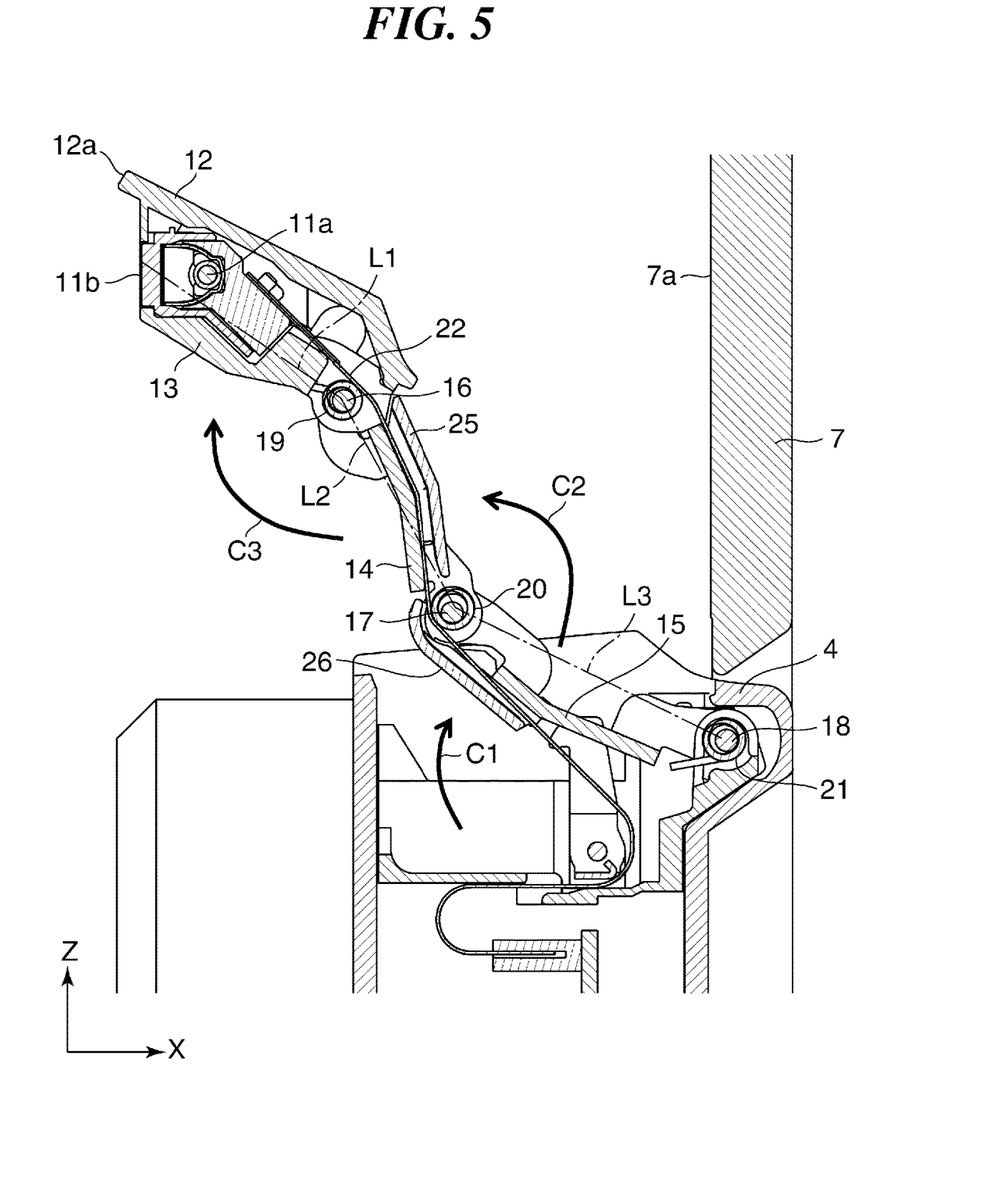
FIG. 5 is a sectional view showing the flash unit shown in FIG. 3 in a case where a light emitting unit is in the light-emitting position.

FIG. 3 is an exploded perspective view showing the flash unit having the light emitting unit 10. FIG. 4 is a sectional view showing the flash unit and vicinities thereof in a case where the light emitting unit 10 is in the retracted position stored inside the body 4. FIG. 5 is a sectional view showing the flash unit and vicinities thereof in a case where the light emitting unit 10 pops up from the body 4 and is in the light-emitting position.

The light emitting component 11 that constitutes the light emitting unit 10 has a xenon tube 11a, Fresnel lens 11b, and reflector 11c. The xenon tube 11a is a discharge tube in which electrodes are arranged at both sides of a glass tube that encloses xenon gas. The Fresnel lens 11b is arranged in front of the xenon tube 11a in order to converge a discharge light from the xenon tube 11a within a photographing field angle of the image pickup apparatus 1. The reflector 11c plays a role that reflects the discharge light from the xenon tube 11a to the object side and illuminates the inside of the photographing field angle efficiently. The reflector 11c is incorporated so as to contact to the xenon tube 11a. It should be noted that the reflector 11c doubles as a role of a trigger electrode for starting discharge of the xenon tube 11a. That is, the reflector 11c is connected to a trigger coil (not shown). When voltage is applied to both the electrodes of the xenon tube 11a, high voltage is applied to the trigger coil, the xenon gas inside the xenon tube 11a ionizes, and light is emitted.

The flash unit is provided with an upper arm member (a first support member) 14, a lower arm member (a second support member) 15, an upper rotating shaft (a first rotating shaft) 16, a lower rotating shaft (a second rotating shaft) 17, a fixed rotating shaft (a third rotating shaft) 18, and three torsion springs (first, second, and third energizing members) 19, 20, and 21. Moreover, the flash unit is provided with a flexible substrate 22, a flash circuit board 23, a connector 24, an upper arm cover 25, a lower arm cover 26, a lock member 27, a lock rotating shaft 28, a torsion spring 29, a base 30, and a coil spring 31.

The upper arm member 14 and lower arm member 15 link the base 30 fixed to the body 4 to the light emitting unit 10. Specifically, a bearing 13a is provided in the bottom face cover 13 that constitutes the light emitting unit 10, and a first bearing 14a is provided in the upper arm member 14. The upper rotating shaft 16 is inserted into the bearing 13a of the bottom cover 13 and the first bearing 14a of the upper arm member 14. The bottom cover 13 and upper arm member 14 are connected rotatably through the upper rotating shaft 16. A second bearing 14b is provided in the upper arm member 14, and a first bearing 15a is provided in the lower arm member 15. The lower rotating shaft 17 is inserted into the second bearing 14b of the upper arm member 14 and the first bearing 15a of the lower arm member 15. The upper arm member 14 and lower arm member 15 are connected rotatably through the lower rotating shaft 17. The base 30 is a foundation of the flash unit, and is attached to the body 4. A bearing 30a is provided in the base 30, and a second bearing 15b is provided in the lower arm member 15. The fixed rotating shaft 18 is inserted into the bearing 30a of the base 30 and the second bearing 15b of the lower arm member 15. The lower arm member 15 is rotatable to the base 30 through the fixed rotating shaft 18.

The upper rotating shaft 16, lower rotating shaft 17, and fixed rotating shaft 18 are inserted into the bearings as mentioned above so as to penetrate coil portions of the torsion springs 19, 20, and 21, respectively. The upper rotating shaft 16, lower rotating shaft 17, and fixed rotating shaft 18 are arranged so as to be approximately parallel to the Y-axis. As shown in FIG. 4, an alternate long and short dash line L1 that connects the center of an external exposed area of the Fresnel lens 11b with the upper rotating shaft 16, an alternate long and short dash line L2 that connects the upper rotating shaft 16 with the lower rotating shaft 17, and an alternate long and short dash line L3 that connects the lower rotating shaft 17 with the fixed rotating shaft 18 are prescribed. One end of the torsion spring 19 in the longitudinal direction (Y-axis direction) abuts on the bottom face cover 13, and the other end abuts on the upper arm member 14. Accordingly, the torsion spring 19 energizes the bottom face cover 13 and upper arm member 14 in a direction that spreads the angle formed between these members. That is, the torsion spring 19 energizes the bottom face cover 13 and upper arm member 14 in the direction that spreads the angle formed between the alternate long and short dash lines L1 and L2 in FIG. 4. In the same manner, the torsion spring 20 energizes the upper arm member 14 and lower arm member 15 in a direction that spreads the angle formed between the alternate long and short dash lines L3 and L2 in FIG. 4. Moreover, the torsion spring 21 energizes the lower arm member 15 in a direction that rotates the alternate long and short dash line L3 in the clockwise direction in FIG. 4 around the fixed rotating shaft 18.

The lock member 27 plays a role that holds the light emitting unit 10 in the retracted position. Hook portions 27a are provided in right and left ends (ends in the Y-axis direction) of the lock member 27. When the light emitting unit 10 is in the retracted position, the hook portions 27a engage with a hook support portion 13b provided in the bottom face cover 13 to lock the light emitting unit 10. The lock rotating shaft 28 inserted into the lock member 27 is inserted into a coil portion of the torsion spring 29. The torsion spring 29 energizes the lock member 27 in a direction that engages the hook portions 27a of the lock member 27 to the hook support portion 13b of the bottom face cover 13. The lock rotating shaft 28 is attached to the base 30. Accordingly, the lock member 27 is rotatably attached to the base 30 around the lock rotating shaft 28.

The flexible substrate 22 has wiring that is electrically connected with the trigger coil, both the electrodes of the xenon tube 11a, etc. of the light emitting component 11. One end of the flexible substrate 22 is connected to the light emitting component 11, and the other end is connected to the connector 24 implemented in the flash circuit board 23. A boosting element for emitting flash light by the xenon tube 11a and other elements are implemented in the flash circuit board 23. The light emitting component 11 is connected to the flash circuit board 23 electrically through the connector 24 and flexible substrate 22. It should be noted that the flash circuit board 23 is connected to a control circuit (not shown) provided in the body 4 through a flexible substrate (not shown) in order to control photography, flash emission, etc. The upper arm cover 25 and lower arm cover 26 are respectively arranged opposite to the upper arm member 14 and lower arm member 15 in order to protect the flexible substrate 22. This forms a part of an inclusion path along which the flexible substrate 22 is arranged.

The inclusion path of the flexible substrate 22 will be described with reference to FIG. 4. The flexible substrate 22 connected to the light emitting component 11 passes the outside of the torsion spring 19 attached to the upper rotating shaft 16, passes a space between the upper arm member 14 and upper arm cover 25, and passes the outside of the torsion spring 20 attached to the lower rotating shaft 17. Subsequently, the flexible substrate 22 passes a space between the lower arm member 15 and lower arm cover 26, passes the outside of the lock rotating shaft 28 and lock member 27, passes a slit provided in the base 30, and is connected to the connector 24 implemented in the flash circuit board 23.

The coil spring 31 arranged at the base 30 energizes the control lever 5 toward the back face of the image pickup apparatus 1. The control lever 5 is attached to the base 30 so as to be slidable in a front-and-back direction (the X-axis direction) of the image pickup apparatus 1. Where the control lever 5 is energized toward the back face of the image pickup apparatus 1, the light emitting unit 10 is locked by the lock member 27 in the retracted position as mentioned above. When the control lever 5 is slid toward the front face of the image pickup apparatus 1, the lock member 27 rotates because a part of the control lever 5 presses a contact part 27b of the lock member 27 toward the front face of the image pickup apparatus 1. Then, the engagement of the hook portions 27a with the hook support portion 13b of the bottom face cover 13 is released because the hook portions 27a of the lock member 27 move toward the back face of the image pickup apparatus 1. Thus, when the lock by the lock member 27 is released, as shown in FIG. 5, the lower arm member 15 rotates in a direction of an arrow C1 by spring force of the torsion spring 21 as shown in FIG. 5. Moreover, the upper arm member 14 rotates in a direction of an arrow C2 by spring force of the torsion spring 20. Then, the light emitting unit 10 rotates by a predetermined angle in a direction of an arrow C3 by spring force of the torsion spring 19. Thus, when the lock by the lock member 27 is released, the light emitting unit 10 pops up to the light-emitting position according to the energization force of the torsion springs 19, 20, and 21.

In order to hold the light emitting unit 10 in the light-emitting position, a stopper for regulating a rotating angle is provided near each bearing. Specifically, a convex part 15b1 is provided in the lower arm member 15 near the second bearing 15b, a convex part 14b1 is provided in the upper arm member 14 near the second bearing 14b, and a stopper 26a is provided in the lower arm cover 26. The lower arm member 15 stops at a predetermined angle when the convex part 15b1 abuts on a stopper support portion (not shown) of the base 30. Moreover, the upper arm member 14 stops rotating when the convex part 14b1 of the upper arm member 14 abuts on the stopper 26a of the lower arm cover 26. Since the lower arm cover 26 is positioned by the lower arm member 15 and is fixed, the upper arm member 14 and lower arm member 15 stop at a predetermined opening angle. Similarly, when a convex part (not shown) provided near the first bearing 14a of the upper arm member 14 abuts on a contact part (not shown) provided in the bottom face cover 13 of the light emitting unit 10, the light emitting unit 10 and upper arm member 14 stop at a predetermined opening angle. As a result of the above-mentioned operations, the light emitting component 11 is held at the light-emitting position.

Next, a relation between the rotating operation of the display unit 7 and the pop-up action of the light emitting unit 10 will be described. FIG. 4 shows a configuration in a case where the light emitting unit 10 is in the retracted position and the display unit 7 is in the stand-up position. A broken line 7c shown in FIG. 4 shows the regular position of the display unit 7. An alternate long and two short dashes line 7a1 shows a position of a front face of the display unit 7 in a case where the display unit 7 is in the stand-up position.

The fixed rotating shaft 18 is provided in the body 4 more on the back face side than the position of the front face of the display unit 7 (the alternate long and two short dashes line 7a1) when the display unit 7 is in the stand-up position. Namely, the fixed rotating shaft 18 is arranged near the backmost position of the image pickup apparatus 1, which allows employing the lower arm member 15 that efficiently uses the length of the body 4 in the X-axis direction (the front-and-back direction of the image pickup apparatus 1). This lengthens the length of the alternate long and short dash line L3, which increases the pop-up amount of the light emitting unit 10. Moreover, when the light emitting unit 10 is in the retracted position, the upper rotating shaft 16 is arranged more on the side of the front face of the body 4 than the position of the front face of the display unit 7 (the alternate long and two short dashes line 7a1) when the display unit 7 is in the stand-up position. This enables the light emitting unit 10 to pop up without being obstructed by the display unit 7. In order to lengthen the alternate long and short dash line L3 as long as possible, the lower arm member 15 is arranged near the inner wall of the body 4 that constitutes the backmost part of the image pickup apparatus 1. Moreover, when the light emitting unit 10 is in the retracted position, the lower rotating shaft 17 is arranged more on the front face side than the upper rotating shaft 16, and is arranged at the side lower than the fixed rotating shaft 18 (the bottom side of the body).

In the image pickup apparatus 1, the fixed rotating shaft 18 and the rotating shaft 7b of the display unit 7 are arranged side by side in the Y-axis direction (the direction that intersects perpendicularly with the sheet of FIG. 4), and are arranged on an approximately same axis parallel to the Y-axis. This enables miniaturization of the entire image pickup apparatus 1 by improving component arrangement efficiency, increases the pop-up amount of the light emitting unit 10, and enables the light emitting unit 10 to pop up even when the display unit 7 is in the stand-up position.

Incidentally, the position of the back end of the upper surface cover 12 is designed so as to enable the light emitting unit 10 to pop up when the display unit 7 is in the stand-up position. Accordingly, it is necessary to avoid a collision between the upper surface cover 12 and the display panel 7a of the display unit 7 in the stand-up position when the light emitting unit 10 is popped up. This is for preventing damage to the display panel 7a. The collision of the upper surface cover 12 against the display panel 7a is avoidable by adjusting a balance between energization force amounts of the torsion springs 19, 20, and 21 in a case where the light emitting unit 10 is in the retracted position. The energization force amount Fa19 of the torsion spring 19 shall be given to the bottom face cover 13 and upper arm member 14 in the direction that spreads the angle between the alternate long and short dash line L1 and alternate long and short dash line L2 in the case where the light emitting unit 10 is in the retracted position. The energization force amount Fa20 of the torsion spring 20 shall be given to the upper arm member 14 and lower arm member 15 in the direction that spreads the angle between the alternate long and short dash line L2 and alternate long and short dash line L3 in the case where the light emitting unit 10 is in the retracted position. In this case, the energization force amounts satisfy a relationship of "Fa19<Fa20". Accordingly, the upper surface cover 12 pops up away from the display panel 7a before rotating so as to approach the display panel 7a in the stand-up position. Accordingly, even if the light emitting unit 10 pops up in the state where the display unit 7 is in the stand-up position, the upper surface cover 12 does not collide with the display panel 7a. It should be noted that the energization force amount of the torsion spring 21 has to be set within a range where a time condition that is necessary to complete the pop-up action of the light emitting unit 10 is satisfied.

Moreover, when the light emitting unit 10 is in the retracted position, the position of the lower rotating shaft 17 in the Z-axis direction (the height direction of the image pickup apparatus 1) is below the fixed rotating shaft 18 (at the bottom side of the image pickup apparatus 1) as shown in FIG. 4. Accordingly, the lower rotating shaft 17 moves in the direction away from the display panel 7a from start of the pop-up action of the light emitting unit 10 until the position of the lower rotating shaft 17 in the Z-axis direction coincides with the fixed rotating shaft 18. Until then, the upper arm member 14 moves in the direction of the arrow C2. Accordingly, the upper surface cover 12 is away from the display panel 7a, and the collision to the display panel 7a is avoidable.

When a user pushes the front end 12a of the upper surface cover 12 of the light emitting unit 10 in the light-emitting position toward the fixed rotating shaft 18, the light emitting unit 10 is moved to the retracted position. The operability in that case is subject to the effect of the balance between the energization force amounts of the torsion springs 19, 20, and 21. The energization force amount Fb19 of the torsion spring 19 shall be given to the bottom face cover 13 and upper arm member 14 in the direction that spreads the angle between the alternate long and short dash line L1 and alternate long and short dash line L2 in the case where the light emitting unit 10 is in the light-emitting position. The energization force amount Fb20 of the torsion spring 20 shall be given to the upper arm member 14 and lower arm member 15 in the direction that spreads the angle between the alternate long and short dash line L2 and alternate long and short dash line L3 in the case where the light emitting unit 10 is in the light-emitting position. When the light emitting unit 10 is in the light-emitting position, the energization force amount Fb21 shall be given to the lower arm member 15 so that the lower arm member 15 may be rotated around the fixed rotating shaft 18. In this case, the energization force amounts satisfy a relationship of "Fb20<Fb19<Fa20". Accordingly, when the light emitting unit 10 is retracted, the light emitting unit 10 begins to move in the direction contrary to the arrow C3 around the upper rotating shaft 16 after the upper arm member 14 begins to move in the direction contrary to the arrow C2 around the lower rotating shaft 17, and then, the lower arm member 15 begins to move in the direction contrary to the arrow C1 around the fixed rotating shaft 18. As a result, the light emitting unit 10 in the light-emitting position is smoothly moved to the retracted position without colliding with the display panel 7a. It should be noted that both the relationships of "Fa19<Fa20" and "Fb20<Fb19<Fb21" may be held.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-149846, filed Jul. 29, 2016, which is hereby incorporated by reference herein in its entirety.

What is claimed is:

1. An image pickup apparatus comprising:
a display unit that is arranged rotatably between a regular position opposite to a back face of a body of the image pickup apparatus and a stand-up position that is rotated from the regular position by about 180 degrees so as to stand up from an upper face of the body; and
a flash unit that is provided on the upper face of the body so that a light emitting unit is movable between a light-emitting position that is projected from the body and a retracted position that is retracted inside the body, said flash unit comprising:
a first rotating shaft, a second rotating shaft, and a third rotating shaft that are arranged in parallel mutually;
a first support member that is rotatably connected with the light emitting unit through said first rotating shaft; and
a second support member that is rotatably connected with said first support member through said second rotating shaft and is rotatably connected with the body through said third rotating shaft,
wherein said third rotating shaft is arranged more on a side of the back face of the body than said first rotating shaft and said second rotating shaft is arranged more on a side of a front face of the body than said first rotating shaft in a case where the light emitting unit is in the retracted position, and
wherein the light emitting unit is movable between the retracted position and the light-emitting position even in a case where said display unit is in the stand-up position.

2. The image pickup apparatus according to claim 1, wherein said third rotating shaft is arranged more on the side of the back face than a front face of said display unit in the case where said display unit is in the stand-up position.

3. The image pickup apparatus according to claim 1, wherein a rotating shaft of said display unit and said third rotating shaft are provided side by side in an axial direction of said third rotating shaft.

4. The image pickup apparatus according to claim 1, wherein a rotating shaft of said display unit and said third rotating shaft are arranged on an approximately same axis.

5. The image pickup apparatus according to claim 1, wherein said first rotating shaft is arranged more on the side of the front face of the body than a front face of said display unit in the case where said display unit is in the stand-up position.

6. The image pickup apparatus according to claim 1, wherein said light emitting unit are in a said retracted position, a said second rotating shaft is arranged more on a side of a bottom face of the body than said third rotating shaft in the case where the light emitting unit is in the retracted position.

7. The image pickup apparatus according to claim 1, further comprising:
a first energizing member that gives energization force that spreads an angle between the light emitting unit and said first support member to the light emitting unit and said first support member; and
a second energizing member that gives energization force that spreads an angle between said first support member and said second support member to said first support member and said second support member,
wherein the energization force of said second energizing member is larger than the energization force of said first energizing member in the case where the light emitting unit is in the retracted position.

8. The image pickup apparatus according to claim 1, further comprising:
a first energizing member that gives energization force that spreads an angle between the light emitting unit and said first support member to the light emitting unit and said first support member;
a second energizing member that gives energization force that spreads an angle between said first support member and said second support member to said first support member and said second support member; and
a third energizing member that gives energization force that rotates said second support member around said third rotating shaft to said second support member,
wherein the energization force of said first energizing member is larger than the energization force of said second energizing member, and the energization force of said third energizing member is larger than the energization force of said first energizing member in a case where the light emitting unit is in the light-emitting position.

9. A flash unit provided in an image pickup apparatus, the flash unit comprising:
a first rotating shaft, a second rotating shaft, and a third rotating shaft that are arranged in parallel mutually;
a light emitting unit and a first support member that are mutually and rotatably connected through said first rotating shaft;
a second support member that is rotatably connected with said first support member through said second rotating shaft and is rotatably connected with the image pickup apparatus through said third rotating shaft;
a first energizing member that gives energization force that spreads an angle between the light emitting unit and said first support member to the light emitting unit and said first support member;
a second energizing member that gives energization force that spreads an angle between said first support member and said second support member to said first support member and said second support member; and
a third energizing member that gives energization force that rotates said second support member around said third rotating shaft to said second support member, wherein said third rotating shaft is arranged more on a side of a back face of the image pickup apparatus than said first rotating shaft and said second rotating shaft is arranged more on a side of a front face of the image pickup apparatus than said first rotating shaft in a case where said light emitting unit is in a retracted position that is retracted inside the image pickup apparatus, and wherein said light emitting unit is moved from the retracted position to a light-emitting position that is projected from the image pickup apparatus when said light emitting unit rotates around said first rotating shaft by a predetermined angle according to the energization force of said first energizing member, said first support member rotates around said second rotating shaft by a predetermined angle according to the energization force of said second energizing member, and said second support member rotates around said third rotating shaft by a predetermined angle according to the energization force of said third energizing member.

* * * * *